United States Patent [19]

Moeller et al.

[11] Patent Number: 4,653,917
[45] Date of Patent: Mar. 31, 1987

[54] FIBER OPTIC GYROSCOPE OPERATING WITH UNPOLARIZED LIGHT SOURCE

[75] Inventors: Robert P. Moeller, Fort Washington, Md.; William K. Burns, Alexandria, Va.

[73] Assignee: The United States of America as represented by the Secretary of the Navy, Washington, D.C.

[21] Appl. No.: 478,593

[22] Filed: Mar. 24, 1983

[51] Int. Cl.[4] .......................... G01C 19/64; G01B 9/02
[52] U.S. Cl. ................................................ 356/350
[58] Field of Search ........................................ 356/350

[56] References Cited

U.S. PATENT DOCUMENTS

| 4,259,016 | 3/1981 | Schiffner | 356/350 |
|---|---|---|---|
| 4,265,541 | 5/1981 | Leclerc et al. | 356/350 |
| 4,286,878 | 9/1981 | Pircher | 356/350 |
| 4,302,107 | 11/1981 | Schiffner et al. | 356/350 |
| 4,323,310 | 4/1982 | Shaw et al. | 356/350 |
| 4,325,636 | 4/1982 | Schiffner | 356/350 |
| 4,329,056 | 5/1982 | Lacombat et al. | 356/350 |
| 4,342,517 | 8/1982 | Johnson et al. | 356/350 |
| 4,354,760 | 10/1982 | Schiffner | 356/350 |
| 4,529,312 | 7/1985 | Pavlath et al. | 356/350 |

OTHER PUBLICATIONS

G. A. Pavlath & H. J. Shaw; "Birefringence and Polarization Effects in Fiber Gyroscopes"; Applied Optics; vol. 21, No. 10, dated 15 May 1982; p. 1752.
R. Ulrich & M. Johnson; Fiber-Ring Interferometer: Polarization Analysis"; Optics Letters; vol. 4, No. 5, May 1979, p. 152.
R. Ulrich; "Fiber-Optic Rotation Sensing with Low Drift"; Optics Letters; vol. 5, No. 5; May 1980, p. 173.
T. P. Lee et al; "A Stripe-Geometry Double-Heterostructure Amplified-Spontaneous-Emission (Superluminescent) Diode", IEEE J. of Quan. Elec., vol. QE-9, No. 8, Aug. 1973, p. 82.
S. K. Sheem; "Fiber-Optic Gyroscope with (3×3) Directional Coupler"; Appl. Phys. Letts. 32 (10), 15 Nov. 1980, p. 869.
K. Bohm et al., "Low-Drift Fiber Gyro Using a Superluminescent Diode"; Electronic Letters 17 (352); 1981.
Burns et al., "Observation of Low Noise in a Passive Fiber Gyroscope", Paper Presented at the Topical Meeting on Optical Fiber Communication, Phoenix, Apr. 13-15, 1982.
Burns et al., "Observation of Low Noise in a Passive Fiber Gyroscope", Electronics Letters, vol. 18, No. 15, 22 Jul. 1982, pp. 648-650.

Primary Examiner—Vincent P. McGraw
Attorney, Agent, or Firm—Sol Sheinbein; John L. Forrest

[57] ABSTRACT

A fiber optic gyroscope comprising a Sagnac interferometer including a (3×3) optical directional coupler. The gyroscope is driven with an essentially unpolarized broadband spatially coherent light beam supplied by a super-luminescent diode source. A significant reduction in baseband noise occurs due to the use of the essentially unpolarized light beam.

1 Claim, 2 Drawing Figures

4,653,917

FIBER OPTIC GYROSCOPE OPERATING WITH UNPOLARIZED LIGHT SOURCE

BACKGROUND OF THE INVENTION

The present Invention relates in general, to a fiber optic gyroscope and, more particularly, to a fiber optic gyroscope utilizing an unpolarized light source to provide an unpolarized optical input.

The state of the art in fibre-optic gyroscopes is approaching theoretical limits for rotation sensing, but the requirements for active control of noise sources and sensitivity tends towards systems with complicated components and electronics. In contrast, the concept of a totally passive fibre gyroscope, without such active control, has appeal for applications owing to the resulting component simplicity and small volume requirements. Many applications for such a device only require moderate rotation rate capabilities of 1–10 degrees per hour. The original demonstrations of the fibre gyroscope were passive, but were limited theoretically in that the device sensitivity approached zero for small rotation rates.

U.S. Patent Application Ser. No. 320,999, now U.S. Pat. No. 4,440,498, by Sheem discloses a passive fiber optic gyroscope utilizing a (3×3) directional coupler as an optical input/output device. This gyroscope automatically operates at the maximum sensitivity or quadrature point at zero rotation rate. Additionally, the device exhibits low noise levels, in the few degrees per second range.

Subsequent improvements in single-mode fiber coupler fabrication have occurred which have resulted in still lower noise levels. Additionally, it is now recognized that a significant portion of the observed fiber optic gyroscope noise is due to fluctuations in the Rayleigh backscattered light. This source of noise can be greatly reduced by changing from a single frequency optical input to a broadband input.

Another source of noise in fiber optic gyroscopes is due to "polarization noise" which results from the use of polarized optical sources to drive these devices. The present Inventors have determined that a significant reduction in the polarization noise can be achieved in a (3×3) optical gyroscope with no reduction in performance or increase in other forms of noise by the use of an essentially unpolarized broadband optical source to drive the device.

SUMMARY OF THE INVENTION

Accordin9ly, one object of the present Invention is to provide an improved optical gyroscope.

Another object is to significantly reduce the inherent noise levels in an optical gyroscope.

Still another object is to significantly reduce the polarization noise in an optical gyroscope.

These and other objects and advantages are achieved in an improved optical gyrosocpe according to the present Invention which comprises an interferometer including a (3×3) optical directional coupler. The coupler includes a first optical waveguide coupled between a first input port and a first output port of the coupler. The coupler further includes a second optical waveguide coupled between a second input port and a second output port, and a third optical waveguide coupled between a third input port and a third output port of the coupler. The interferometer further includes a fiber optic coil coupled between the second and third output ports of the coupler. A means for introducing an essentially unpolarized spatially coherent input light beam into the first input port of the coupler is included. The input light beam is divided into a first beam appearing at the second ouput port and a second beam appearing at the third output port. The first and second beams counter-propagate within the fiber optic coil. Additionally, the gyroscope includes a means for measuring the intensities of light signals appearing at the second and third input ports of the coupler.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
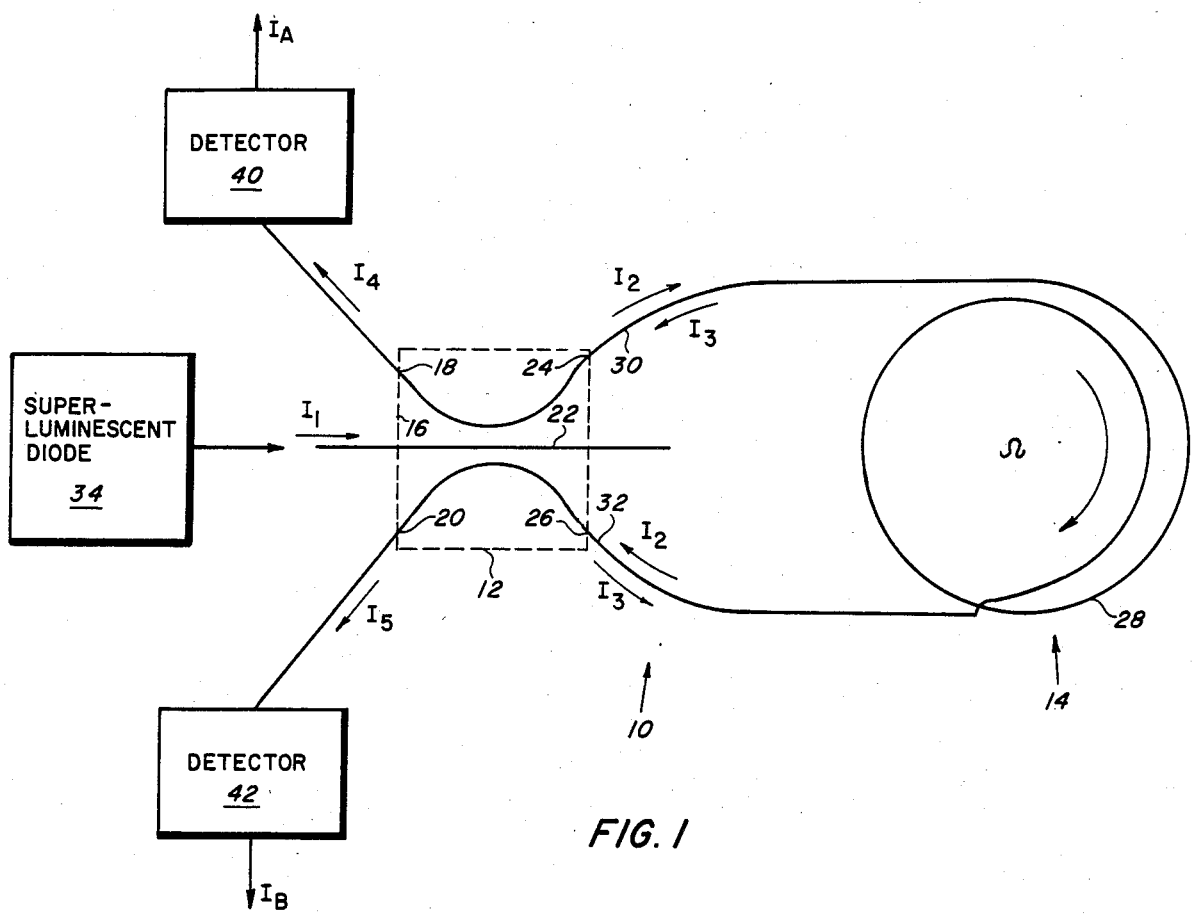
FIG. 1 is a schematic illustration of a preferred embodiment of the present Invention.

Referring now to the drawings, wherein like reference numerals designate identical or corresponding parts throughout the several views, and more particularly to FIG. 1 thereof, a fiber optic gyroscope 10 according to a preferred embodiment of the present Invention is illustrated. The gyroscope 10 includes a (3×3) directional waveguide coupler 12 with a fiber optic coil 14 coupled thereto to form a Sagnac interferometer.

The directional coupler 12 includes three input ports, 16, 18 and 20 and three output ports 22, 24, and 26. The coupler 12 is preferably a fused, biconically tapered coupler formed from three single mode optical fibers in a well-known manner. Alternatively, the coupler 12 could be a planar waveguide coupler device formed on a planar dielectric surface by well-known methods, such as by integrated optical techniques.

The fiber optic coil 14 includes a long single-mode optical fiber 28 wound in a plurality of turns to form a coil. The fiber 28 should preferably be 100 meters long or longer. The respective ends, 30 and 32, of the fiber 28 are coupled to the respective output ports 24 and 26 of the coupler 12. The middle output port 22 of the coupler 12 is unterminated. In a typical application, the fiber coil 14 is disposed upon a rotating platform (not illustrated) with the plane of the coil perpendicular to the axis of rotation of the platform so that the rotation rate $\Omega$ of the platform may be sensed.

The optical input to the gyroscope 10 is provided by a super-luminescent diode 34. The light output $I_1$ of the diode 34 is coupled into the gyroscope 10 at the middle input port 16 of the optical coupler 12. The superluminescent diode is preferably used because it is a source of high power (greater than 1mw), broadband (bandwidth of 100–200Å), essentially unpolarized, spatially coherent light. The measured degree of polarization of the light output of such devices is typically P=0.16 where P is the fraction of the total beam power which is polarized. P ranges between 0 for totaly unpolarized light to 1 for totally polarized light. The degree of polarization for the output of the super-luminescent diode may be reduced to an approximate minimum of P=0.02, if desired, by the use of appropriate polarization selective reflection or absorption devices (not illustrated) as is known in the art.

Super-luminescent diodes are known in the art and are also called super-radiant diodes. Such devices are described by T. P. Lee, et al., IEEE Journal of Quantum Electronics, Vol. QE 9, No. 8, August 1973, pp. 820–828. These devices may be commercially obtained from General Optronics Corporation.

The input optical beam $I_1$ is split by the optical coupler 12 into two equal beams $I_2$ and $I_3$. The beam $I_2$ is injected into the end 30 of the fiber coil 14 while the beam $I_3$ is injected into the end 32 of the coil 14. After counter-propagating in the coil 14, the beam $I_2$ is returned to the output port 26 of the coupler 12 via the fiber end 32 while the beam $I_3$ is returned to the output port 24 by way of the fiber end 30. The beams $I_2$ and $I_3$ enter the coupler 12 where they interfere with each other, the interference being related to the rate of rotation $\Omega$ of the coil 14. The signal produced by the interference of beams $I_2$ and $I_3$ within the coupler 12 is then split by the action of the coupler into two equal beams $I_4$ and $I_5$ which appear as outputs at the respective input ports 18 and 20 of the coupler 12.

The beams $I_4$ and $I_5$ are coupled to respective photoelectric detectors 40 and 42 which produce output signals $I_A$ and $I_B$ proportional to the respective intensities of the beams $I_4$ and $I_5$. The normalized detected intensities are given by:

$$I_A = (1/9)[2 - \cos 2\phi + \sqrt{3} \sin 2\phi] \quad (1)$$

$$I_B = (1/9)[2 - \cos 2\phi - \sqrt{3} \sin 2\phi] \quad (2)$$

where $2\phi$ is the relative Sagnac phase shift which occurs between the beams $I_2$ and $I_3$ counter-propagating within the fiber coil 14. It should be noted that when $2\phi=0$, $I_A=I_B$ and thus the gyroscope 10 operates at quadrature or maximum sensitivity for small phase shifts.

The signals $I_A$ and $I_B$ may be processed electronically to form the signal T as follows:

$$T = I_A - I_B = \left(\frac{2\sqrt{3}}{9}\right) \sin 2\phi \quad (3)$$

Finally, the signal T may be plotted to determine Sin 2100. The rate of rotation $\Omega$ may be determined from the relation:

$$2\phi = \frac{8\pi N A \Omega}{c\lambda} \quad (4)$$

where N is the number of turns in the coil 14, A is the area of the coil, c is the free space velocity of light, and $\lambda$ is the free space wavelength of the input beam $I_1$.

In an experimental embodiment, the super-luminescent diode 34 had a wavelength of 0.84μm and a bandwidth of 15 mn at 1.3 mw output. The degree of polarization at an operating power of 0.9 mw was measured to be P=0.16. The output $I_1$ of the diode 34 was coupled into the input port 16 of the coupler 12 in a manner which allowed a polarizer (not illustrated) to be inserted into the beam $I_1$. The fiber coil 14 was formed of 1.1 km of Corning TM single-mode fiber (0.1 NA, 4μm diameter core) wound on a 15 cm diameter drum. The output beams $I_4$ and $I_5$ were detected and amplified by a pair of Coherent Radiation TM model 212 power meters. The outputs of the meters were combined (Equation 3) and the result T was recorded on a strip chart recorder. The small signal sensitivity, $$s = (1/I_4)(d\, I_4/d\phi) \quad (5)$$

was measured to be 0.67/rad or 40% of the maximum sensitivity of $\sqrt{3}$/rad.

Figure 2:
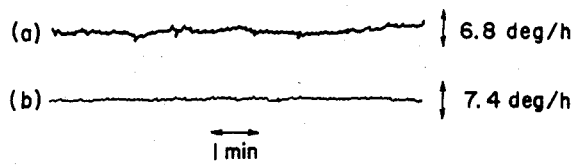
FIG. 2 presents baseline noise plots illustrating the reduction in polarization noise achieved by the present invention.

FIG. 2 illustrates plots of the function T showing the baseband noise of the gyroscope 10 of the present Invention embodied as described above. Curve (a) represents the baseband noise with the polarizer inserted into the input beam $I_1$, while curve (b), illustrates the baseband noise produced by the use of the super-luminescent diode source 34 in its naturally essentially unpolarized state. A factor of two to four short term noise reduction was observed with the unpolarized source (curve (b)) as compared to the polarized source (curve (a)). Short term noise levels of less than 1 degree per hour and 10 minute drift of less than two degrees per hour were observed for the condition of curve (b). The Inventor's believe that the remaining polarization noise occurring in the system is a result of polarization dependence of the (3×3) coupler 12.

Obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In an optical gyroscope of the type comprising a (3×3) optical directional coupler having a first waveguide coupled between a first input port and a first output port of said coupler, a second waveguide coupled between a second input port and a second output port of said coupler, and a third waveguide coupled between a third input port and a third output port of said coupler, said gyroscope further comprising a fiber coil coupled between said second and third output ports of said coupler, optical signals introduced at said first input port of said coupler being divided into first and second optical beams which appear at said second and third output ports of said coupler to counter-propagate within said fiber optic coil, and means coupled to said second and third input ports of said coupler for measuring the intensities of optical signals appearing at said second and third input ports, wherein the improvement comprises:

a super-luminescent diode light source coupled to said first input port of said coupler for introducing an essentially unpolarized optical beam into said first input port of said coupler, whereby the polarization noise appearing in the measured intensities of said optical signals appearing at said second and third input ports of said coupler is reduced.

* * * * *